(No Model.) 2 Sheets—Sheet 1.
T. E. LITTLEFIELD.
COMBINED ELEVATOR, CLEANER, DISTRIBUTER, AND FEEDER FOR SEED COTTON.
No. 517,979. Patented Apr. 10, 1894.
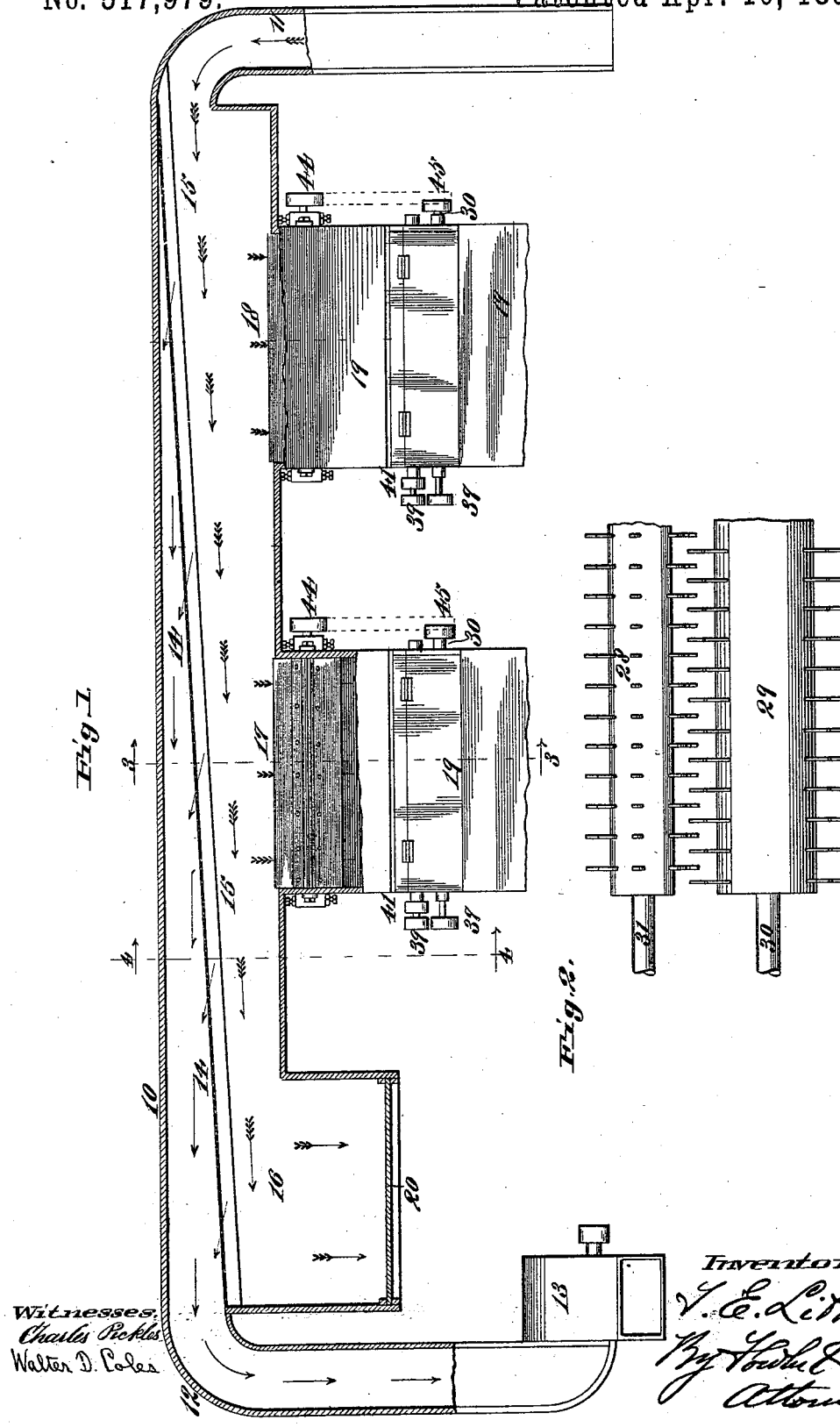

(No Model.) 2 Sheets—Sheet 2.
T. E. LITTLEFIELD.
COMBINED ELEVATOR, CLEANER, DISTRIBUTER, AND FEEDER FOR SEED COTTON.
No. 517,979. Patented Apr. 10, 1894.
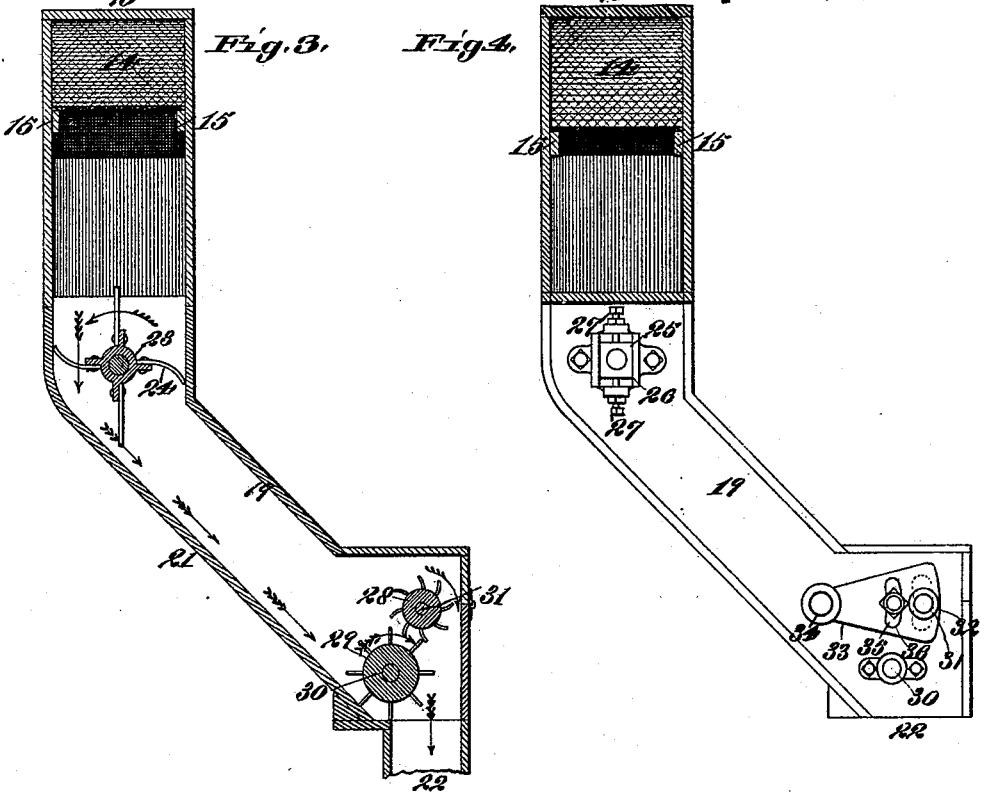
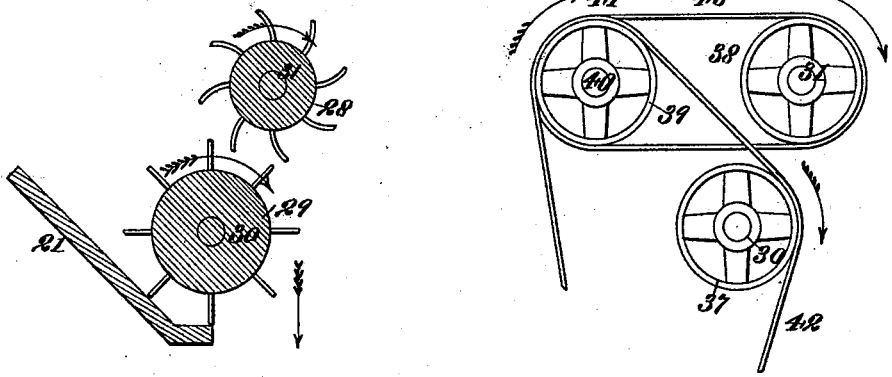
Witnesses:
Charles Pickles,
Walter D. Coles
Inventor:
T. E. Littlefield,
By Fowler & Fowler
Attorneys.

UNITED STATES PATENT OFFICE.

THOMAS E. LITTLEFIELD, OF HILLSBOROUGH, TEXAS.

COMBINED ELEVATOR, CLEANER, DISTRIBUTER, AND FEEDER FOR SEED-COTTON.

SPECIFICATION forming part of Letters Patent No. 517,979, dated April 10, 1894.

Application filed June 26, 1893. Serial No. 478,822. (No model.)

*To all whom it may concern:*

Be it known that I, THOMAS E. LITTLEFIELD, a citizen of the United States, residing at Hillsborough, county of Hill, and State of Texas, have invented a certain new and useful Combined Elevator, Cleaner, Distributer, and Feeder for Seed-Cotton, of which the following is such a full, clear, and exact description as will enable any one skilled in the art to which it appertains to make and use the same, reference being had to the accompanying drawings, forming part of this specification.

The object of my invention is to provide a simple and efficient apparatus for conveying seed-cotton from a wagon or other source of supply, to one or more gins or gin feeders, said apparatus being adapted, at the same time, to thoroughly clean the seed-cotton and to deliver it to the gins or feeders in the desired quantities in a uniform manner, and in loose and uncompacted condition.

The patentable novelty of my invention will be particularly pointed out in the description and claims, which follow.

My invention will be best understood by reference to the accompanying drawings, in which—

Figure 1 is a front view of one form of my apparatus, the receiver being shown in section, and the dependent chutes in elevation. Fig. 2 is a side elevation of the spiked feed-rollers employed in my apparatus, part of the same being broken away. Fig. 3 is a transverse section of my apparatus taken on the line 3—3, Fig. 1. Fig. 4 is a similar transverse section of my apparatus taken on the line 4—4, Fig. 1. Fig. 5 is a detail view on an enlarged scale, designed to illustrate the relative position and direction of rotation of the spiked feed-rollers. Fig. 6 is a detail view illustrating a mode of propelling the spiked feed-rollers.

Referring to the drawings, in which the same marks of reference indicate the same parts throughout the several views: 10 is an air-tight box or receiver, preferably of considerable length. Communicating with said receiver 10, at one end thereof, is a trunk or tube 11 through which the seed-cotton passes from the wagon or other source of supply to the receiver 10. The trunk or tube 11 may communicate with the source of supply of seed-cotton either directly, or through any suitable telescopic connection. Communicating with the receiver 10 at the opposite end thereof, is the trunk or tube 12, the said trunk or tube 12 leading to any suitable exhaust or fan 13 (Fig. 1). The said trunks 11 and 12 are preferably of less area in cross-section than the receiver 10. Within the receiver 10, extending longitudinally from end to end thereof, preferably in a diagonal direction, is the screen 14 made of wire gauze or other suitable foraminous material. Said screen 14 extends across the receiver 10 from the front to the rear wall thereof, and has one end thereof attached to the upper wall or casing of the receiver 10 immediately above the point where the trunk 11 enters the same, and the other end thereof attached to the casing of the opposite end of the receiver at a point just below the aperture through which the trunk 12 enters the said receiver. The screen 14 is properly held up by means of supporting strips 15 secured to the side walls of the receiver 10 immediately underneath said screen.

The lower wall or bottom of the receiver 10 is cut away at 16, 17 and 18. In the drawings (Fig. 1) I have shown the dependent chutes 19 as secured to the receiver 10 underneath the apertures 17 and 18; and I have shown the aperture 16 as not provided with a dependent chute leading to a gin or feeder, but as being closed by a sliding bottom piece 20. Under the arrangement shown, cotton will pass to the gins or feeders through the dependent chutes 19, and the aperture 16 will act as an overflow into which the excess of cotton not passing to the gins through the depending chutes 19, will be collected. If, however, it be desired, a similar dependent chute 19 may be also placed underneath the aperture 16. I wish, in this connection, to say that I do not limit myself to an apparatus having any particular number of dependent chutes adapted to convey cotton to gins or feeders, as it is obvious that my apparatus is adapted to deliver cotton through a single dependent chute to a single gin, or through any number of chutes to any number of gins.

The dependent chute 19 consists of a trunk formed by a suitable casing 21. The lower parts of the chutes 19 do not extend directly downward, but project forward at an angle of about forty-five degrees (45°) to the vertical. The chutes 19 are provided at their lower ends with openings 22, immediately underneath which are placed the gins or gin feeders. For the purpose of keeping the receiver 10 airtight, I provide a winged valve 23, the said winged valve being provided with the flexible wings 24. One of the winged valves 23 is placed in the upper part of each of the dependent chutes 19 and is so adjusted therein that, as it revolves, the ends of the several wings 24 will pass slightly above the level of the bottom wall of the receiver 10. The winged valves 23 are journaled in suitable bearings 25 at the sides of the dependent chutes 19, the said bearings being adapted to be moved upward and downward in suitable slots 26 by means of the adjusting screws 27. The purpose of having said winged valves 23 mounted adjustably as aforesaid, is to permit of their being raised and lowered so that the ends of the several flexible wings 24 will protrude more or less within the receiver 10, as may be desired. It is one of the functions of said winged valves 23 to stir up the seed-cotton passing through the receiver, and to assist and facilitate its delivery into the dependent chutes 19, and the extent to which this function will be performed by said winged valves is controlled at will by elevating or lowering the same. Near the lower end of each of the dependent chutes 19 are placed spiked feed-rollers 28 and 29. The spiked feed-roller 29 is mounted upon a shaft 30, and said shaft is journaled in suitable bearings at the side of the chute 19. The spiked feed-roller 28 is placed within the chute 19 above the roller 29, and is mounted upon a shaft 31, which shaft is journaled in bearings 32 formed in the pivoted arms 33 mounted upon the sides of the chute 19. The said pivoted arms 33 are adapted to rotate about their pivots 34 so as to raise and lower the spiked roller 28, the pivoted arms 33 being maintained in the desired position by means of the adjusting screws 35 which are secured to the casing 21 of the chute 19 and pass through slots 36 formed in said arms 33 (Fig. 4).

In Fig. 6 I have illustrated one mode of propelling the spiked feed-rollers 28 and 29. 37 is a pulley mounted upon an extension of the shaft 30 which supports the spiked roller 28. 38 is a pulley mounted upon an extension of the shaft 31 which carries the spiked roller 28. 39 is a pulley mounted upon a stud 40 attached to the side wall of the chute 19. Immediately behind the pulley 39 is a second pulley 41, also mounted upon the stud 40, and secured to or made integral with the pulley 39. A belt 42 passes around any suitable driving pulley from which the power propelling the rollers is to be derived. Said belt 42 passes over the pulley 37 and around the pulley 39. A second belt 43 passes around the pulleys 41 and 38. The belt 42 being set in motion in the direction indicated by the arrows (Fig. 6) will cause the pulleys 30 and 39 to rotate. The rotation of the pulley 39 will produce a similar rotation of the pulley 41, which will be communicated to the pulley 38 through the belt 43, thereby serving to propel the two spiked feed-rollers in the desired direction. The desired rotation may be imparted to the winged valve 23 by means of a pulley 44 mounted upon the shaft carrying said winged valve, said pulley 44 being propelled by a belt (indicated by dotted lines, Fig. 1) passing over the same and around a second pulley 45 mounted upon an extension of the shaft 31 carrying the feed-roller 28.

The mode of operation of my apparatus may be briefly described as follows: The fan 13 being set in motion, creates a draft of air through the trunk 11 and the receiver 10 in the direction indicated by the unfeathered arrows (Fig. 1). The seed-cotton will be drawn through the trunk 11 into the receiver 10 by means of said draft of air. As the area of the receiver 10 is considerably greater than that of the trunk 11, it is obvious that the seed-cotton will not be carried through the receiver with the same facility that it is carried through the trunk by such draft of air. There will be a tendency of the seed-cotton to gravitate to the bottom of said receiver, because of the dispersion of the air draft in the receiver. The downwardly inclined direction of the screen 14 will also operate to depress the mass of seed-cotton, passing through the receiver, toward the bottom thereof, so that progressively there will be a greater tendency for such seed-cotton to pass into the dependent chutes as it passes along the receiver toward the left thereof. The dust, dirt and other foreign particles intermixed with the seed-cotton will be carried by the draft of air through the screen 14, and thence out of the receiver to the trunk 12, while the seed-cotton itself will be arrested by the screen 14 as aforesaid. The revolving wings 24 of the winged valve 23 protrude more or less into the receiver 10, and hence as the seed-cotton moves along the bottom of said receiver, it will be stirred up or agitated so as to loosen it and permit the dust and other impurities to be drawn out by the draft of air, while at the same time the protruding wings as they revolve, will operate to assist in drawing the cotton into the dependent chutes 19. If it is found that any chute is not receiving its proper proportion of seed cotton, the winged valve 23 therein may be somewhat elevated by means of the adjusting appliances hereinbefore described, so that more seed-cotton will be drawn into said chute. As the chute 19 extends downwardly, not in a true vertical direction, but at an angle of about forty-five (45°) degrees to the vertical, the cotton will not drop directly upon the feed-rollers, thereby tending to compact said cotton and clog up said rollers, but will slide gently down the inclined chute until it is caught by the spikes upon the roller 29, which revolves in the direction indicated by the arrow (Figs. 3 and 5). The cotton is carried around by the revolving feed-roller 29, and is delivered into the gin-breast or gin feeder through the opening 22 at the lower end of the chute 19. The second roller 28 placed above the roller 29, revolves in the same direction as the roller 29, and co-operates with the roller 29 to thoroughly loosen any wads or compacted masses of cotton, and at the same time, operates to remove from the spikes of the roller 29 the excess of cotton which may be thereon, so that the cotton will be delivered in the desired quantity and in a loose and uncompacted condition to the gin or feeder. By elevating or depressing the roller 28 as previously described, the quantity of cotton passing between said rollers may be regulated at will.

Having fully described my invention, what I desire to claim and secure by Letters Patent of the United States is—

1. In a pneumatic cotton handling apparatus, the combination of a trunk, a box or receiver with which said trunk communicates, means for creating a draft of air through said trunk and said box or receiver, chutes communicating with said receiver and extending downwardly therefrom, a winged valve adapted to rotate in said chute, and appliances for raising and lowering said winged valve so that the same will extend more or less into said receiver.

2. In a pneumatic cotton handling apparatus, the combination of a trunk or tube, a box or receiver with which said trunk or tube communicates, one or more depending chutes communicating with said receiver, a rotary valve in said chute or chutes withdrawing said cotton from said receiver and impelling it into said chutes, and one or more feed rollers for delivering cotton from the chutes to the gin or gin feeders.

3. In a pneumatic cotton handling apparatus, the combination of a trunk or tube, a box or receiver with which said trunk or tube communicates, one or more depending chutes communicating with said receiver, a rotary valve in said chute or chutes withdrawing said cotton from said receiver and impelling it into said chutes, a pair of feed rollers at the bottom of said chute, and adjusting devices for increasing or decreasing the interval between said rollers.

4. In a pneumatic cotton handling apparatus, the combination of a trunk, a box or receiver with which said trunk communicates, means for creating a draft of air through said trunk and said receiver, one or more chutes extending downwardly from said receiver, a winged valve adapted to rotate in said chute, appliances for raising and lowering said winged valve, and a pair of feed-rollers for delivering the cotton from the chute to a gin or gin feeder.

5. In a pneumatic cotton handling apparatus, the combination of a trunk, a receiver with which said trunk communicates, a second trunk communicating with a fan or exhaust, a screen interposed between said trunks, one or more chutes communicating with the receiver and extending downwardly therefrom at an angle to the vertical, a winged valve journaled in the upper part of said chutes, adjusting devices for raising and lowering said winged valve, a pair of feed-rollers for delivering the cotton from the chute to a gin or gin feeder, and adjusting devices for controlling the interval between said feed rollers.

In testimony whereof I have hereunto set my hand and affixed my seal, this 20th day of June, 1893, in the presence of the two subscribing witnesses.

T. E. LITTLEFIELD. [L. S.]

Witnesses:
G. R. BENNETT,
I. ROSENBAUM.